Jan. 21, 1936. L. F. HARZA 2,028,448
HYDRAULIC TURBINE
Filed April 3, 1935
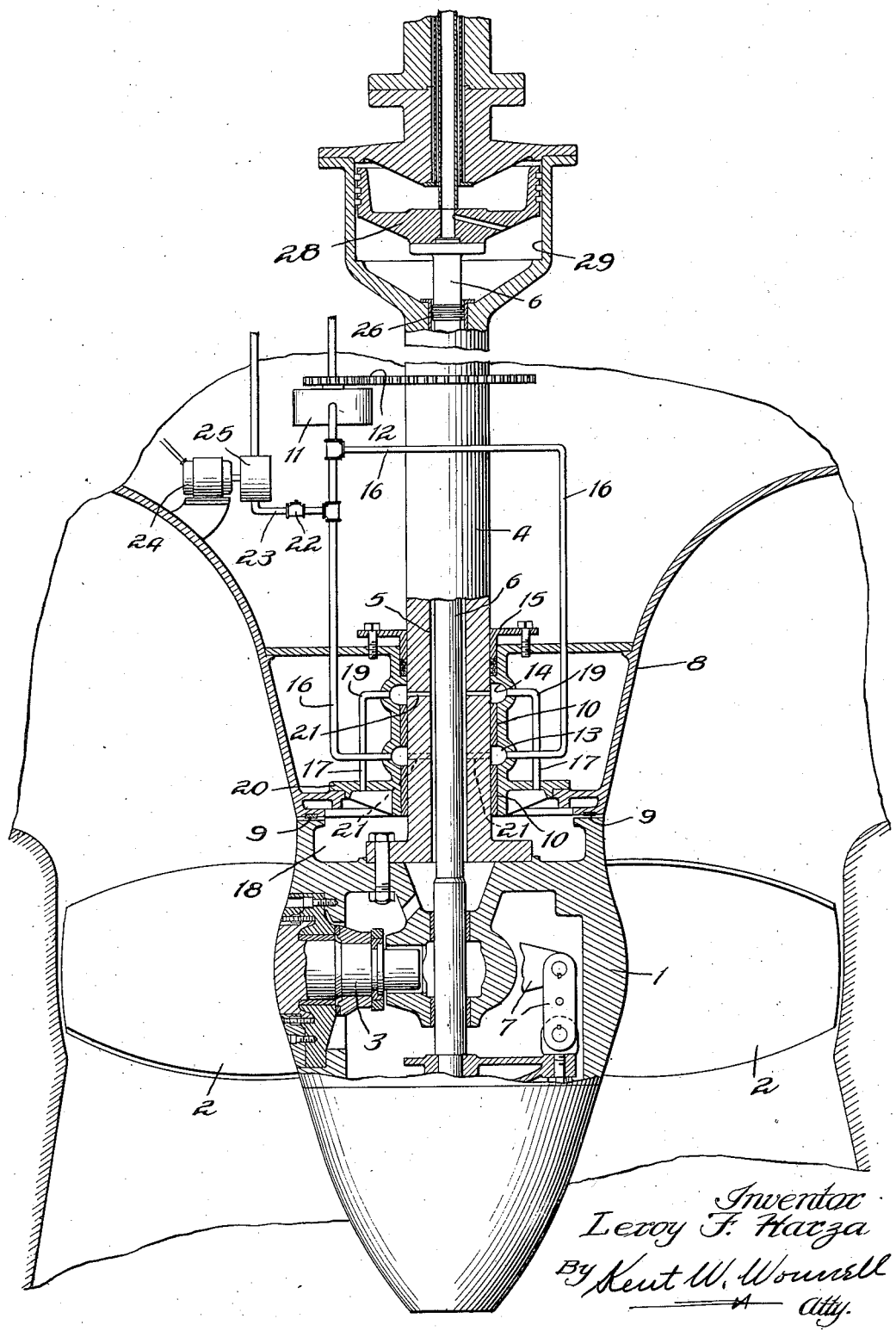
Inventor
Leroy F. Harza
By Kent W. Worrell
Atty.

Patented Jan. 21, 1936

2,028,448

UNITED STATES PATENT OFFICE 2,028,448

HYDRAULIC TURBINE

Leroy F. Harza, Ravinia, Ill.

Application April 3, 1935, Serial No. 14,415

7 Claims. (Cl. 253—148)

This invention relates in general to hydraulic power turbines of the vertical shaft type and has more particular reference to the lubrication of the lower shank bearings and propeller blades and to insure the mechanism against the entry of water into the hub of the turbine.

An important object of the invention is in the provision of improved means for supplying lubricant to the shank bearings and hub mechanism.

A further object of the invention is to insure that the turbine hub is filled with grease while in operation and thereby to prevent the access of water to the interior mechanism.

A still further object of the invention is in the location of a pressure lubricating pump adjacent to the outside of the lower turbine bearing and to provide communication with the interior hub mechanism by an opening through the shaft and in communication with a pressure chamber surrounding the turbine shaft adjacent the lower bearing and to which lubricant is supplied under pressure.

In the accompanying drawing illustrating this invention, the figure is a view partly in section and partly in elevation showing a preferred embodiment thereof.

Hydraulic power turbines of the vertical shaft short shank propeller type having blades which are adjustable as to their angular position about axes at right angles to the axis of rotation, are now common in the art. This type of turbine requires a large hub 1 in which the mechanism for changing the blade angle is housed. The blades 2 terminate at their inner ends in circular turned shanks or shaft 3 which enter the hub and are engaged by the blade operating mechanism.

These shanks 3 are necessarily short as they extend only to the center of the hub and must therefore resist a very large cantilever strain due to the head of water and resulting in a heavy bearing pressure on the shank bushing or bearings.

This hub 1 is carried at the lower end of a vertical shaft 4 having a central bore 5 through which an adjustment rod 6 extends loosely for operating the blade angle change mechanism 7 in the hub 1. The rod 6 may be shifted automatically by an attached piston 28 movable in a cylinder 29 with connected fluid pressure means to opposite sides of the piston.

Surrounding the lower portion of the shaft is a casing 8 which conforms to the outer surface of the hub and between the lower end of the casing and the hub is a packing 9 for reducing the leakage between them.

It is customary to maintain the interior of the hub and the space 18 between the hub and the lower portion of casing 8 full of soft grease or heavy oil to insure lubrication of the shank bearings and mechanism. To retain this lubricant in the hub against the pressure of water and to prevent the in-flow of water it is necessary to provide a packing gland of special type where the blade shank enters the hub. Failure of this packing is a common cause of trouble in this type of turbine and frequently results in the entry of water into the hub, loss of lubrication, cutting, searing, and even destruction of bearings and mechanism.

To avoid this trouble it is often possible in low head turbines to maintain an oil level in the hollow shaft above the level of the highest tail water, but even this is not complete protection, against the entry of water, as approximately the upper half circle of the packing ring above the blades is subjected nearly to head water pressure when the turbine is in operation with water flowing downward through the turbine, and below the blades the pressure is that of the draft tube equal to or less than the tail water level.

To be entirely safe the grease or oil in the hub and shaft bearings must therefore be under a pressure nearly that of head water, which may require a long shaft and a high elevation of generator, or other difficulties, entailing a considerable expense.

The use of pressure greased guide bearings for the turbine shaft immediately above the turbine runner at the lower end of the shaft is found advantageous. Grease is forced constantly into a bearing 10 by a small displacement pump 11 operated by a gearing 12 from the turbine shaft whenever it is rotated. This bearing 10 may be of considerable length, receiving lubricant at a groove 13 intermediate its ends, with a reservoir 14 at its upper end sealed by a packing gland 15, and to the groove the pump delivers the lubricant by means of pipes 16.

By providing a small hole 21 in the shaft 4, or a number of such holes, extending from the outer surface adjacent the grease supply groove 13, or the reservoir 14, into the hollow bore 5 of the shaft 4, the grease pump in supplying lubricant to the shaft guide bearing 10 will also maintain a grease pressure in the turbine hub 1 equal to or greater than the water pressure to which the blade shanks are subjected, thereby excluding water from the turbine hub.

After passing through the bearing 10 this grease escapes at the bottom into a chamber 18 between the casing 8 and the hub 1 which communicates with the turbine water passage above the blades and the hub through the packing 9, and therefore against nearly head water pressure. From the reservoir 14 pipes 19 extend through the bearing flange 20 into the chamber 18, so that a supply of lubricant under sufficient pressure to exclude water is applied to the bearing, through the openings 21 to the hub, and by bearing leakage and pipes 19 to the chamber 18 between the hub and the casing 8.

Above the lower end of the shaft 4 it may be provided with a tight bearing 26 within the shaft for sealing the end of the adjustment rod 6 in the passage 5 so that there will be no escape of pressure at this end of the bore 5.

This invention will assure that the hub is completely filled with grease whenever the turbine is rotating and up to the instant of stopping. This will exclude the entry of water during a period when the turbine is idle because the grease will be too stiff to flow out and cannot therefore be displaced by water. However, if desirable a motor driven grease pump 25 may be provided which is operated automatically or manually whenever the turbine and its gear driven grease pump 10 is stopped. This additional pump may be driven electrically from the station storage battery or other reliable source of power, as by an electric motor 24, with a grease pump discharge pipe 23 connected to the other supply pipes 16 through a check valve 22.

I claim:

1. In a hydraulic turbine having a hollow hub and a hollow turbine shaft communicating therewith, a bearing for the shaft adjacent the hub, means for feeding a lubricant to the bearing under pressure, and a transfer opening from the bearing to the interior of the shaft for feeding lubricant thereto and to the hub under pressure.

2. In a hydraulic turbine, a vertical propeller shaft having a hollow passage therein, a hollow hub secured to the end of the shaft and having blades adjustable therein, an adjustment rod extending through the shaft and mechanism operated thereby in the hub for changing the angularity of the blades, a bearing for the shaft having a pressure chamber opening against the side of the shaft, and an opening through the wall of the shaft communicating from the chamber to the interior of the shaft and to the interior of the hub.

3. In a hydraulic power turbine, a hollow bladed propeller hub, a hollow shaft communicating therewith, a bearing for the shaft, means for supplying lubricant to the bearing under sufficient pressure to exclude water, and an opening in the shaft communicating with said lubricant supply means for supplying lubricant to the interior of the shaft and hub under sufficient pressure to exclude water.

4. In a hydraulic power turbine, a hollow propeller hub with turnable blades, a hollow shaft communicating with the hub, a control rod extending through the shaft to operate the blades, a lower bearing for the shaft, means for supplying lubricant under pressure to the bearing, a fluid tight connection around the rod above said bearing, and an aperture in the shaft for receiving lubricant from said supply means to fill the hub and the lower end of the shaft.

5. In a hydraulic power turbine, a hollow propeller hub, a hollow shaft communicating therewith, a supporting casing and a bearing therein for the lower end of the shaft, the outer surface of the hub and casing being substantially continuous, a packing at the outer edges thereof and between the hub and casing, means for supplying a lubricant under pressure to the bearing and to the inner side of the packing at sufficient pressure to exclude water, and an opening in the shaft at the bearing to receive lubricant therethrough and to supply it to the interior of the shaft and hub at sufficient pressure to exclude water.

6. In a hydraulic power turbine, a hollow propeller hub, a hollow shaft in communication therewith, a bearing for the lower end of the shaft, means operated by the shaft for supplying lubricant under pressure to the bearing, and a passage through the shaft communicating with said supply means for also supplying lubricant under pressure to the interior of the shaft and to the interior of the hub.

7. In a hydraulic power turbine, a hollow propeller hub, a hollow shaft in communication therewith, a bearing for the lower end of the shaft, means operated by the shaft for supplying lubricant under pressure to the bearing, and auxiliary power means for supplying lubricant under pressure to the bearing and to the interior of the shaft and hub when the shaft operated means is not actuated by the rotation of the shaft.

LEROY F. HARZA.